United States Patent
Jang et al.

(10) Patent No.: US 9,930,612 B2
(45) Date of Patent: Mar. 27, 2018

(54) SMART HOME APPLIANCE AND CONTROL METHOD THEREOF

(71) Applicant: LG ELECTRONICS INC., Seoul (KR)

(72) Inventors: Bongmun Jang, Seoul (KR); Sanghyuk Yun, Seoul (KR); Hwantae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 14/867,484

(22) Filed: Sep. 28, 2015

(65) Prior Publication Data

US 2016/0219496 A1 Jul. 28, 2016

(30) Foreign Application Priority Data

Jan. 26, 2015 (KR) .................. 10-2015-0012083

(51) Int. Cl.
| | |
|---|---|
| *H04W 4/00* | (2009.01) |
| *H04W 48/16* | (2009.01) |
| *H04L 12/28* | (2006.01) |
| *H04W 12/06* | (2009.01) |
| *H04W 76/02* | (2009.01) |
| *H04L 29/06* | (2006.01) |

(52) U.S. Cl.
CPC ......... *H04W 48/16* (2013.01); *H04L 12/2803* (2013.01); *H04L 12/2809* (2013.01); *H04L 63/08* (2013.01); *H04W 12/06* (2013.01); *H04W 76/02* (2013.01)

(58) Field of Classification Search
CPC . H04L 12/2803; H04L 12/2809; H04L 63/08; H04W 12/06; H04W 48/16; H04W 76/02
See application file for complete search history.

(56) References Cited

U.S. PATENT DOCUMENTS

2013/0268998 A1* 10/2013 Ko .................. H04W 12/06
726/3
2014/0087660 A1* 3/2014 Kim .................. H04L 12/282
455/41.1

(Continued)

FOREIGN PATENT DOCUMENTS

EP 2611079 A1 7/2013
KR 1020140080958 A 7/2014

(Continued)

*Primary Examiner* — Shukri Taha
(74) *Attorney, Agent, or Firm* — Dentons US LLP

(57) ABSTRACT

A smart home accessing a main server providing a service, by using a local network is provided. The smart home includes: at least one first electronic device accessing an access point connected to the main server and having preset AP information and preset authentication information; and at least one second electronic device connected to the access point and the at least one first electronic device to perform wireless communication and having AP information matching the preset AP information, wherein the at least one first electronic device transmits the access point information and the preset authentication information to the at least one second electronic device, when the at least one second electronic device having the AP information matching the preset AP information is found.

18 Claims, 6 Drawing Sheets

(56) References Cited

U.S. PATENT DOCUMENTS

| | | | |
|---|---|---|---|
| 2014/0254577 A1 | 9/2014 | Wright et al. | |
| 2014/0373123 A1* | 12/2014 | Kang | H04L 41/22 726/7 |
| 2015/0026779 A1 | 1/2015 | Ilsar et al. | |
| 2015/0327304 A1* | 11/2015 | Sinnakornsrisuphap | H04L 41/0809 709/227 |
| 2016/0081133 A1* | 3/2016 | Kim | H04L 63/0876 370/329 |
| 2017/0070881 A1* | 3/2017 | Sun | H04L 63/0492 |

FOREIGN PATENT DOCUMENTS

| | | |
|---|---|---|
| KR | 1020140100171 A | 8/2014 |
| WO | 2014/163877 A1 | 10/2014 |

\* cited by examiner

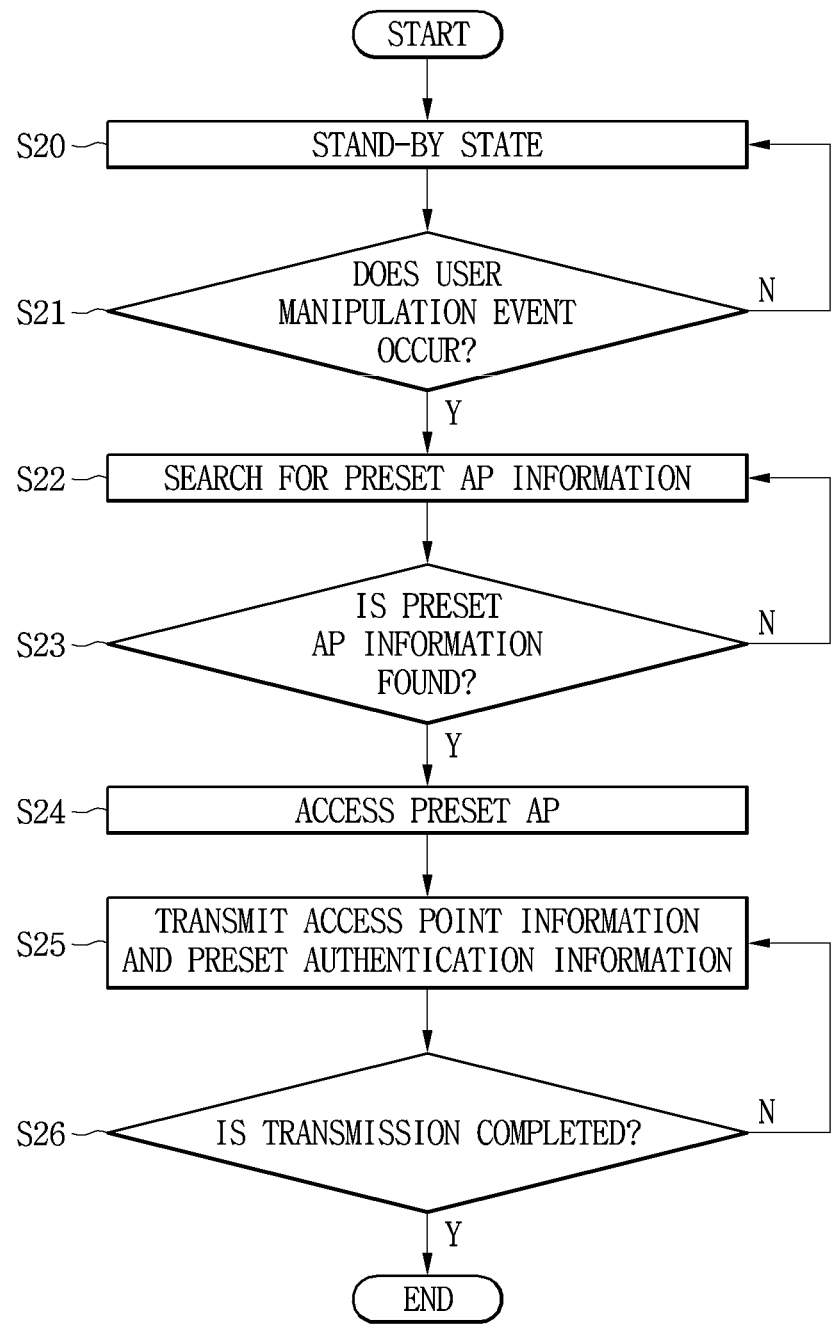

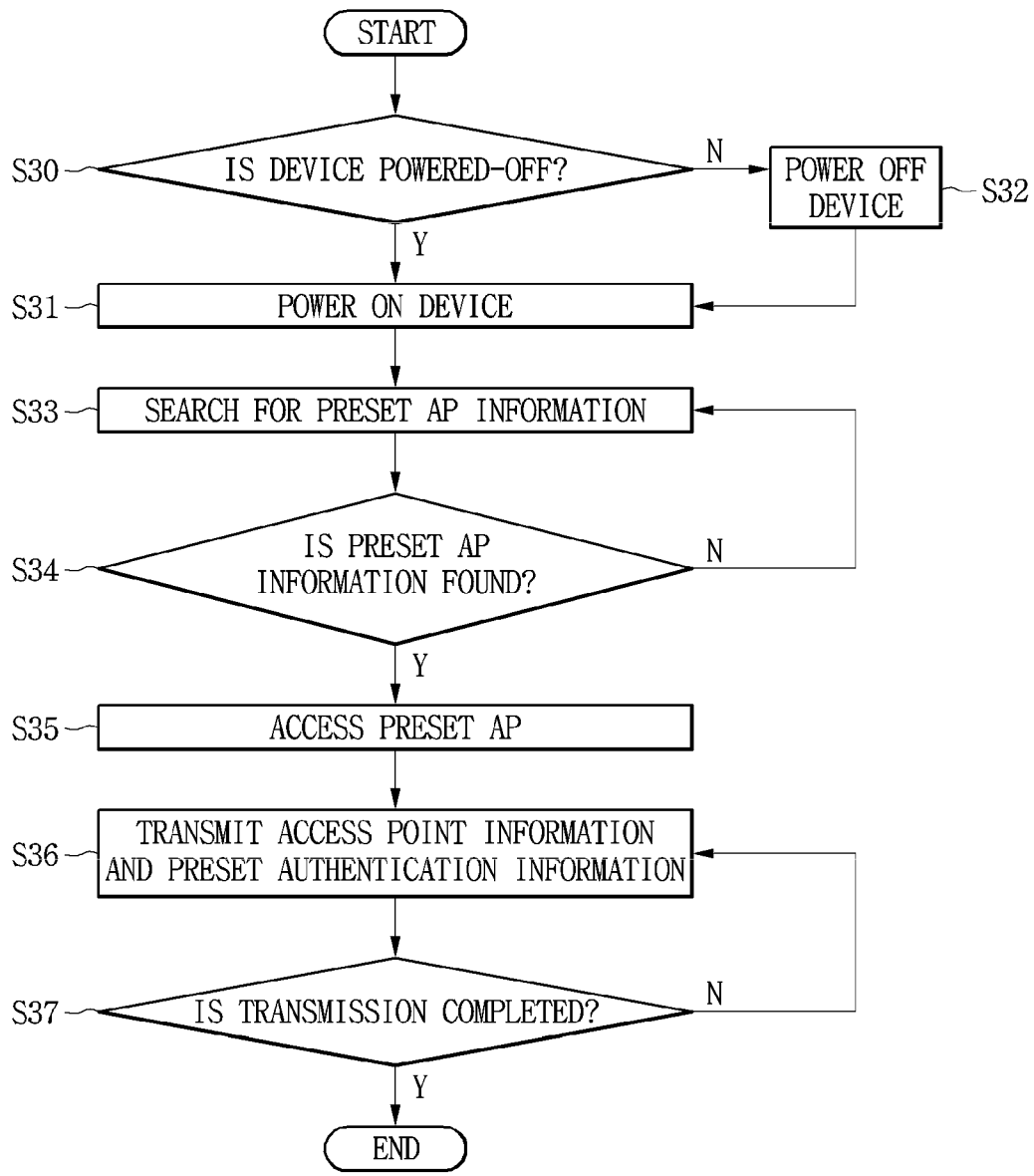

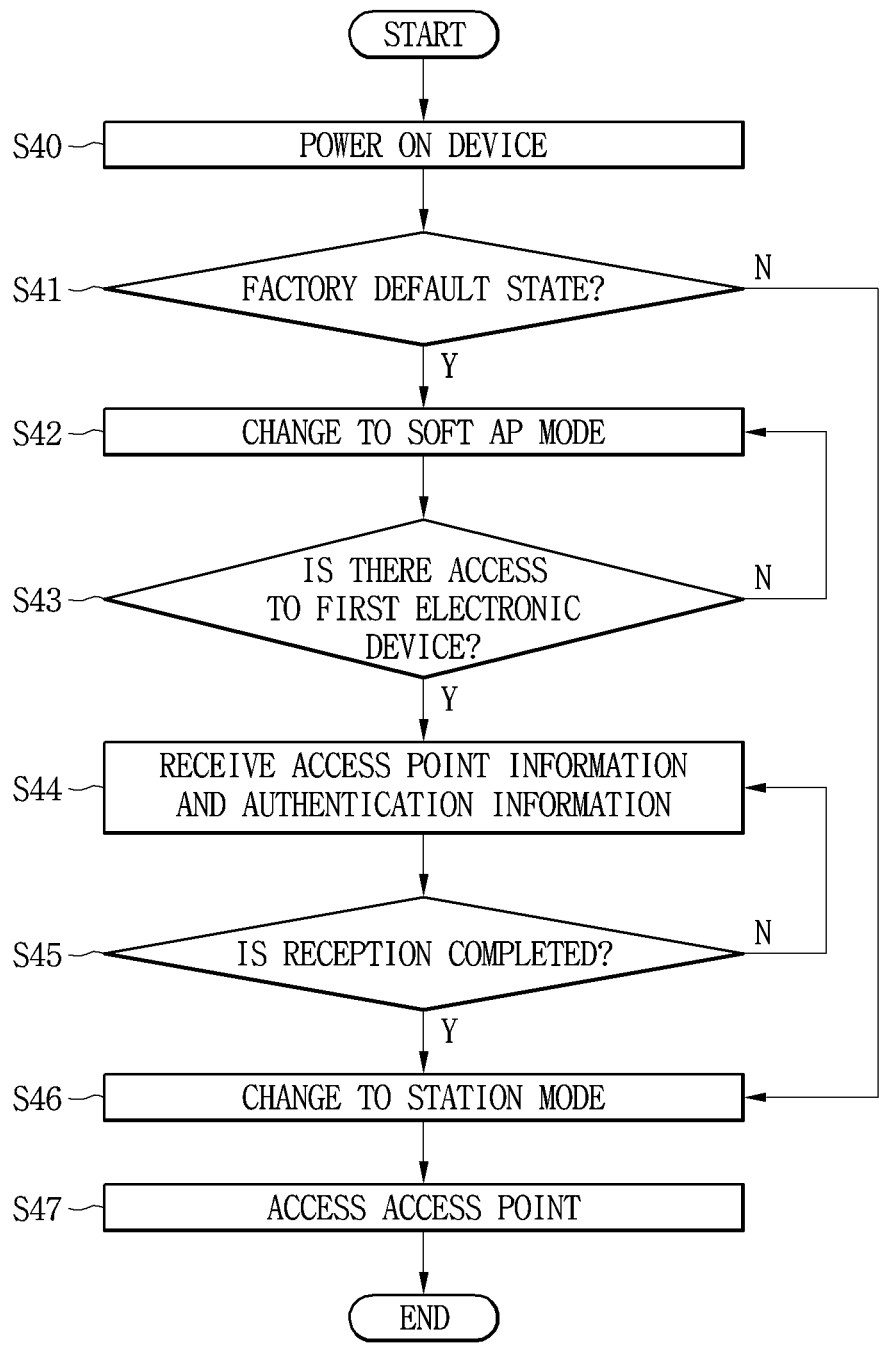

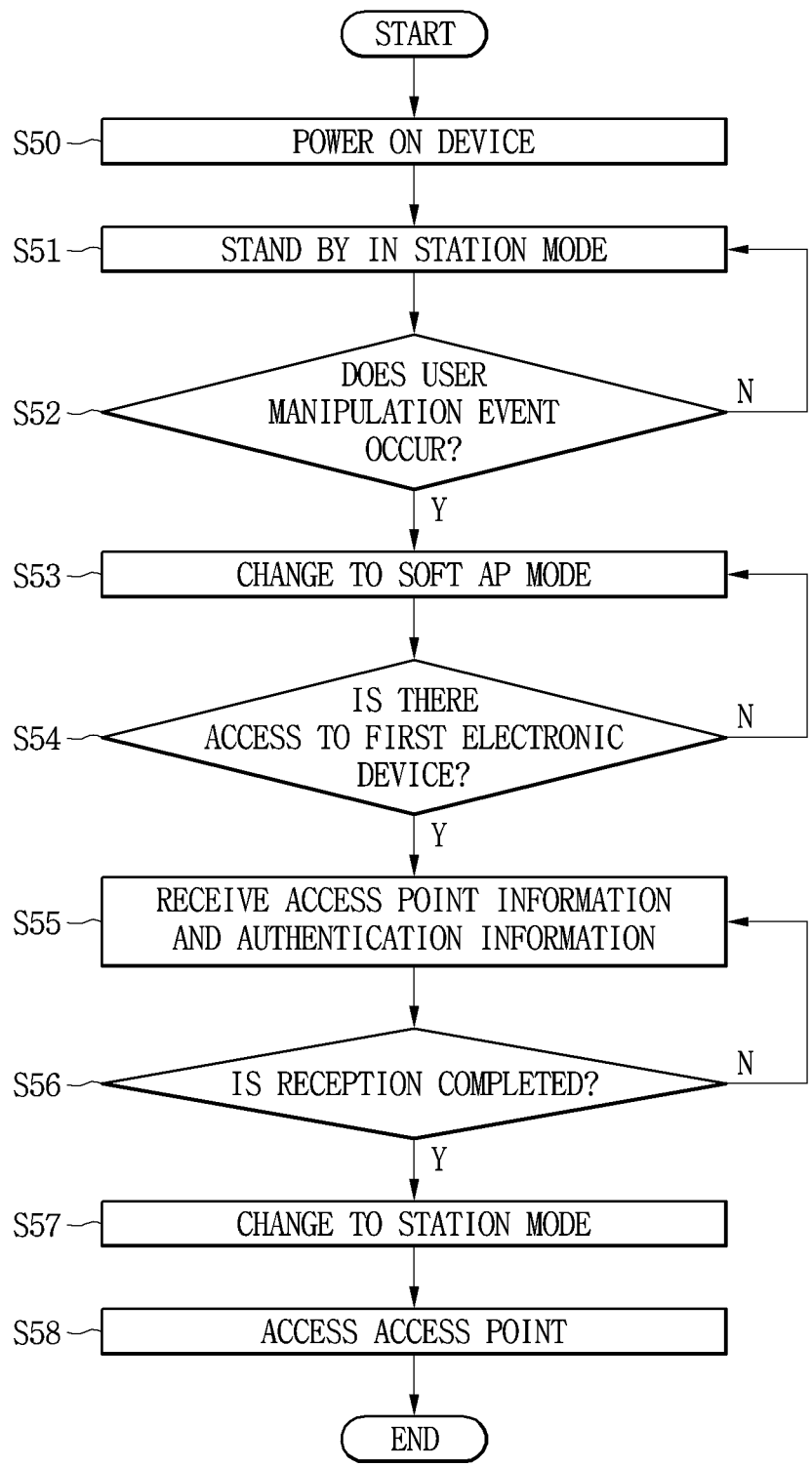

SMART HOME APPLIANCE AND CONTROL METHOD THEREOF

CROSS-REFERENCE TO RELATED APPLICATIONS

The present application claims the benefits of priority to Korean Patent Application No. 10-2015-0012083 (filed on Jan. 26, 2015), which is herein incorporated by reference in its entirety.

BACKGROUND

The present disclosure relates to a smart home appliance and a control method thereof.

Smart home indicates a technology that connects and monitors or controls various items, such as consumer electronics including a TV, air conditioner, refrigerator, and oven, energy consumption apparatuses including water service, electricity, and air cooling and heating apparatuses, and security devices including a door lock and monitoring camera.

In recent times, smart home appliances, such as consumer electronics, energy consumption apparatuses and security devices that support a smart home are gradually receiving attention in the consumer electronics market.

An exemplary smart home appliance is disclosed in Korean Patent Laid Open Publication No. 10-2002-0041193. The smart home appliance as disclosed in the publication generally accesses an access point connected to a main service providing a service by using a local network, performs user authentication on each of individual electronic devices and accesses them.

However, the exemplary smart home appliance has a limitation in that it is inconvenient for a user because when an electronic device is added, the added electronic device needs to access the main server and perform user authentication.

Therefore, there is a need for a smart home appliance that may more simply implement main server access and user authentication processes whenever electronic devices are added, and a control method of the smart home appliance thereof.

SUMMARY

Embodiments provide a smart home that may more simply implement main server access and user authentication processes whenever electronic devices are added, and a control method thereof.

In one embodiment, a smart home accessible a main server providing a service includes: at least one first electronic device accessing an access point connected to the main server and having preset access point (AP) information and preset authentication information; and at least one second electronic device connected to the access point and the at least one first electronic device to perform wireless communication and having AP information matching the preset AP information, wherein the at least one first electronic device transmits the access point information and the preset authentication information to the at least one second electronic device, when the at least one second electronic device having the AP information matching the preset AP information is found using the predetermined AP information that matches with the AP information.

The at least one first electronic device may search for the AP information matching the preset AP information, when a preset search mode is executed.

The preset search mode may be executed according to a preset time interval, the occurrence of a user manipulation event on the first electronic device, or the power-ON of the first electronic device.

The at least one first electronic device may cancel an access to the access point and access the at least one second electronic device when the at least one second electronic device is found.

The at least one first electronic device may cancel an access to the at least one second electronic device and access the access point after the access point information and the preset authentication information are transmitted.

The at least one first electronic device may search for the AP information matching the preset AP information, when the at least one first electronic device accesses the access point.

The at least one second electronic device may receive the access point information and the preset authentication information from the at least one first electronic device when a preset AP mode is executed.

The preset AP mode may be executed, when the second electronic device is initially powered-ON or when a user manipulation event on the second electronic device after the initial power-ON occurs.

The at least one second electronic device may end the preset AP mode when the reception of the access point information and the preset authentication information is completed.

The at least one second electronic device may cancel an access to the at least one first electronic device and access the access point, when the preset AP mode ends.

In another embodiment, a control method of a smart home including at least one first electronic device accessing an access point connected to a main server providing a service and having preset AP information and preset authentication information; and at least one second electronic device connected to the access point and the at least one first electronic device to perform wireless communication and having AP information matching the preset AP information includes: searching for the at least one second electronic device having AP information matching the preset AP information through the at least one first electronic device; and transmitting the access point information and the preset authentication information from the at least one first electronic device to the at least one second electronic device found.

The at least one first electronic device may search for the AP information matching the preset AP information, when a preset search mode is executed.

The preset search mode may be executed according to a preset time interval, the occurrence of a user manipulation event on the first electronic device, or the power-ON of the first electronic device.

The at least one first electronic device may cancel an access to the access point and access the at least one second electronic device, when the at least one second electronic device is found.

The at least one first electronic device may cancel an access to the at least one second electronic device and access the access point, after the access point information and the preset authentication information are transmitted.

The at least one first electronic device may search for the AP information matching the preset AP information, when the at least one first electronic device accesses the access point.

The at least one second electronic device may receive the access point information and the preset authentication information from the at least one first electronic device, when a preset AP mode is executed.

The preset AP mode may be executed, when the second electronic device is initially powered-ON or when a user manipulation event on the second electronic device after the initial power-ON occurs.

The at least one second electronic device may end the preset AP mode when the reception of the access point information and the preset authentication information is completed.

The at least one second electronic device may cancel an access to the at least one first electronic device and access the access point, when the preset AP mode ends.

According to various embodiments above, it is possible to provide a smart home appliance that may more simply implement main server access and user authentication processes whenever electronic device are added, and a control method of the smart home appliance.

The details of one or more embodiments are set forth in the accompanying drawings and the description below. Other features will be apparent from the description and drawings, and from the claims.

BRIEF DESCRIPTION OF THE DRAWINGS

FIG. 3 is a flowchart of an operation according to another embodiment of a first electronic device of the smart home in FIG. 1.

FIG. 4 is a flowchart of an operation according to still another embodiment of a first electronic device of the smart home in FIG. 1.

FIG. 5 is a flowchart of an operation according to an embodiment of a second electronic device of the smart home in FIG. 1.

FIG. 6 is a flowchart of an operation according to another embodiment of a second electronic device of the smart home in FIG. 1.

DETAILED DESCRIPTION OF THE EMBODIMENTS

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
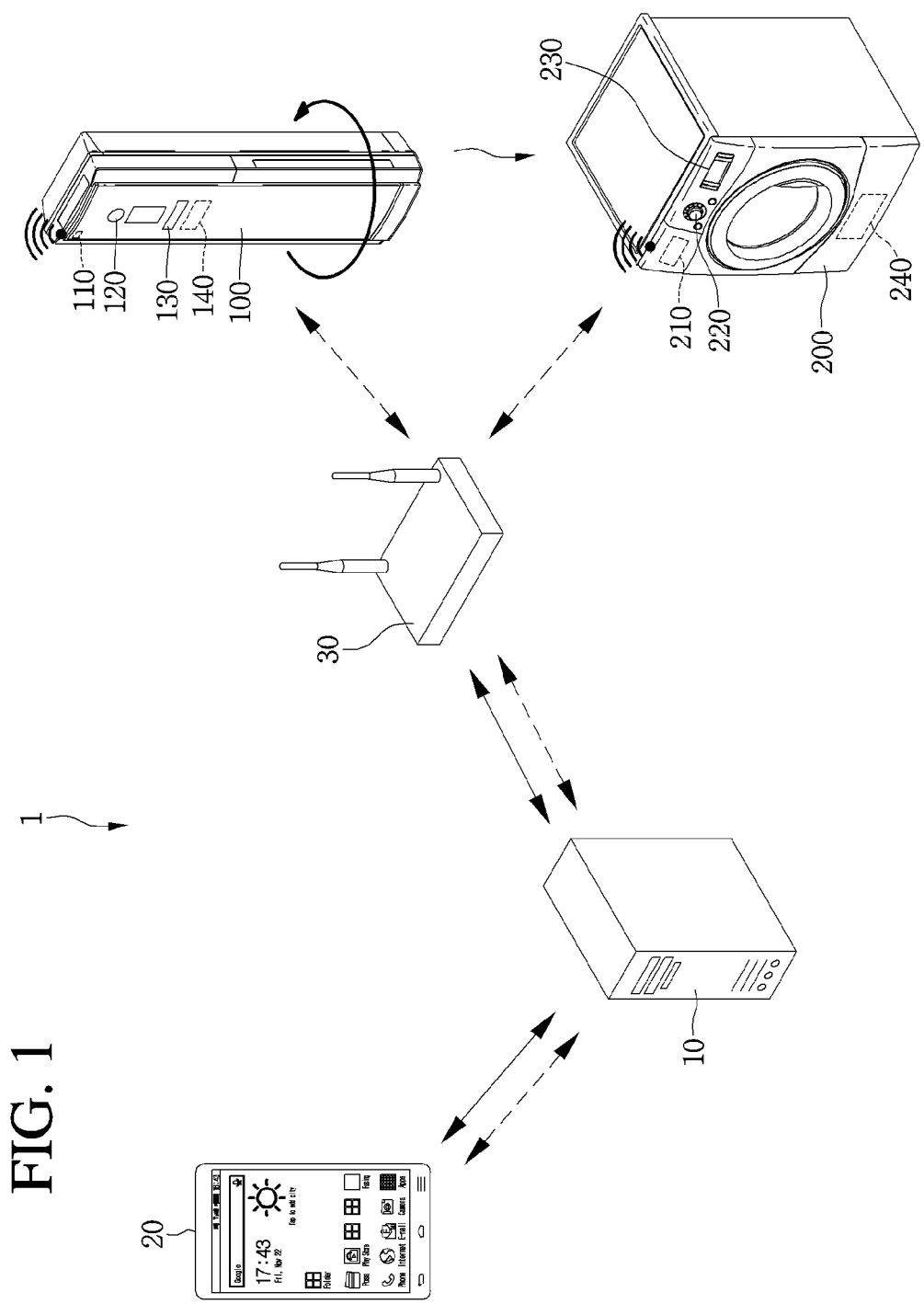
FIG. 1 is a configuration of a smart home according to an embodiment.

FIG. 1 is a configuration of a smart home according to an embodiment.

Referring to FIG. 1, the smart home includes a main server 10, a portable electronic device 20, an access point 30, a first electronic device 100, and a second electronic device 200.

The main server 10 may be a platform for providing a smart home service and may be connected to various contents of the portable electronic device 20, the first electronic device 100, the second electronic device 200, and so on wirelessly or in a wired manner to communicate and/or control the above-described devices.

The main server 10 may function as a conduit that connects various contents of the portable electronic device 20, the first electronic device 100 and the second electronic device 200.

In this example, the main server 10 may be connected to a matched device through user authentication information. In particular, the main server 10 may be connected to devices on which user authentication has been completed, to provide the smart home service.

The portable electronic device 20 may communicate with the main server wirelessly and function as the control device of the smart home 1. As an example, the portable electronic device may be a smart phone, a remote controller, a tablet, a laptop computer, and the like. A user may control the first electronic device 100 and the second electronic device 200 on which user authentication has been completed, through the portable electronic device 20 on which user authentication has also been completed by the main server 10.

The access point 30 wirelessly connects the main server 10 to the first electronic device 100, and the main server 10 to the second electronic device 200. Since the access point is well known, its detailed description is omitted. As an example, the access point 30 may be a router.

The first electronic device 100 may be various electronic devices that may implement a smart home service. For example, the first electronic device 100 may be various consumer electronics that may be connected to the main server 10 to implement a smart home service, such as an air conditioner, refrigerator, washing machine, cooking device, dish washer, and etc. The first electronic device 100 may be a single device or a plurality of devices.

The first electronic device 100 may access the access point 30 connected to the main server 10 to wirelessly communicate with the access point and may have preset access point (AP) information and preset authentication information. In this example, the preset AP information may be service set identifier (SSID) information provided through an agreement with the main server 10, and the preset authentication information may be user authentication information for the user authentication by the main server 10. In this example, the first electronic device 100 may be in a state in which user authentication has already been completed by the main server 10.

The first electronic device 100 may transmit, to the second electronic device, the access point information and the preset authentication information to connect to the main server, when the second electronic device 200 having AP information matching the preset AP information is found.

The first electronic device 100 may include a wireless communication module 110, a power supply unit 120, a user manipulation unit 130, and a control unit 140.

The wireless communication module 110 may be a Wi-Fi module. The inventive concept is not limited thereto, and the wireless communication module may also be other modules that may enable wireless communication with external devices. For example, the wireless communication module 110 may be a Bluetooth module, near field communication (NFC) antenna module, or wireless communication module that performs communication according to various communication protocols, such as IEEE, Zigbee, 3rd generation (3G), 3rd generation partnership project (3GPP) and long term evolution (LTE) communication protocols. In the present embodiment, the Wi-Fi module is used for the purpose of the disclosure.

The power supply unit 120 may include a component for the power-ON/OFF of the first electronic device 100. The power-ON/OFF component may be a button, keypad or touch pad.

The user manipulation unit 130 is a component for performing user manipulation of various operations of the first electronic device 100. The user manipulation unit 130 may be a button, keypad or touch pad.

The control unit 140 is a component for controlling the operation of the first electronic device 100. The control unit may be a microprocessor, a digital signal processor, an application specific integrated circuit (ASIC), and etc. The control unit 140 may have access point 30 information connected to the main server 10, preset AP information, and preset authentication information. The control unit 140 may enable the first electronic device 100 to transmit the access point 30 information and the preset authentication information to at least one second electronic device 200 having AP information matching the preset AP information, when the at least one second electronic device 200 is found.

In this example, the control unit 140 may enable the first electronic device 100 to search for AP information matching the preset AP information when the first electronic device accesses the access point 30 connected to the main server 10.

The control unit 140 may search for AP information matching the preset AP information when a preset search mode is executed. The preset search mode may be executed according to a preset time, by a user manipulation on the first electronic device 100, or a power-ON of the first electronic device 100.

The preset time may be a regularly set time interval. That is, the control unit 140 may search for AP information matching the preset AP information, i.e., an AP matching the preset AP information, at the regularly set time interval.

The occurrence of the user manipulation event on the first electronic device 100 may be user manipulation on the user manipulation unit 130. That is, the control unit 140 may search for AP information matching the preset AP information, i.e., an AP matching the preset AP information, when the user manipulation on the user manipulation unit 130 occurs.

The power-ON of the first electronic device 100 may be the "ON" of the power supply unit 120. That is, the control unit 140 may search for AP information matching the preset AP information, i.e., an AP matching the preset AP information, when the power supply unit 120 is "ON".

The control unit 140 may enable the first electronic device 100 to cancel an access to the main server 10 through the access point 30 and to access the at least one second electronic device 200 having an AP matching the preset AP information, when the at least one second electronic device 200 is found.

In addition, the control unit 140 may enable the first electronic device 100 to cancel an access to the at least one second electronic device and to access the access point 30 to be connected again to the main server 10, when the access point 30 information to connect to the main server 10 and the preset authentication information are transmitted to the at least one second electronic device 200.

The second electronic device 200 may be various types of electronic devices that may implement a smart home service, like the first electronic device 100. For example, the second electronic device 200 may be various consumer electronics that may be connected to the main server 10 to implement a smart home service, such as an air conditioner, refrigerator, washing machine, cooking device, dish washer, and etc.

The second electronic device 200 may be a product in factory default state in which user authentication has not been performed by the main server 10. That is, the second electronic device 200 may be a product on which user authentication has not been performed by the main server 10.

The second electronic device 200 is connected to the access point 30 and the first electronic device 100 to be capable of wirelessly communicating with them and has AP information matching the preset AP information of the first electronic device 100.

The second electronic device 200 includes a wireless communication module 210, a power supply unit 220, a user manipulation unit 230, and a control unit 240.

The wireless communication module 210 may be a Wi-Fi module, like the wireless communication module 110 of the first electronic device 200. The inventive concept is not limited thereto, and the wireless communication module may also be other modules that may enable wireless communication with external devices. For example, the wireless communication module may also be a Bluetooth module, NFC antenna module, or wireless communication antenna module that performs communication according to various communication protocols, such as IEEE, Zigbee, 3G, 3GPP and LTE communication protocols. In the present embodiment, the Wi-Fi module is used for the purpose of disclosure.

The power supply unit 220 may include a component for the power-ON/OFF of the second electronic device 200. The power-ON/OFF component may be a button, keypad or touch pad.

The user manipulation unit 230 is a component for performing user manipulation of various operations of the second electronic device 200. The user manipulation unit 230 may be a button, keypad or touch pad.

The control unit 240 is a component for controlling the operation of the second electronic device 200. The control unit may be a microprocessor, a digital signal processor, an ASIC, and etc. The control unit 240 may enable the second electronic device 200 to receive the access point 30 information to connect to the main server 10 and the preset authentication information from the first electronic device 100 when a preset AP mode is executed.

The preset AP mode may be executed when the second electronic device 200 is initially powered-ON or when a user manipulation event on the second electronic device 200 after the initial power-ON of the second electronic device 200 occurs.

In this example, the preset AP mode may be a soft AP mode set as the SSID information provided through an agreement with the main server 10. The control unit 240 may operate the second electronic device 200 in any one of the soft AP mode and a general station mode. In this example, the general station mode may be a general mode for the execution of a smart ON service, the control of the second electronic device 200, and so on.

The initial power-ON of the second electronic device 200 may be the initial power-ON of the power supply unit 220. That is, the control unit 240 may execute the preset AP mode when the power supply unit 220 is initially powered-ON.

The occurrence of the user manipulation event on the second electronic device after the initial power-ON thereof 200 may be user manipulation on the user manipulation unit 230. That is, the control unit 240 may execute the preset AP mode when user manipulation on the user manipulation unit 230 occurs.

The control unit 240 may enable the second electronic device 200 to end the preset AP mode when the reception of the access point 30 information to connect to the main server 10 and the preset authentication information from the first electronic device 100 is completed. That is, the control unit 240 may operate the second electronic device 200 in the general station mode when the reception of the access point 30 information to connect to the main server 10 and the preset authentication information is completed.

The control unit 240 may cancel an access to the first electronic device 200 to and access the access point 30 to connect to the main server 10 when the preset AP mode after the reception of the access point 30 information and the preset authentication information is completed.

In the description to follow, operations according to various embodiments of the first electronic device 100 and the second electronic device 200 of the smart home 1 are described in detail. For instance, an operation may be instructions that are executed by the control unit 140 or the control unit 240.

Figure 2:
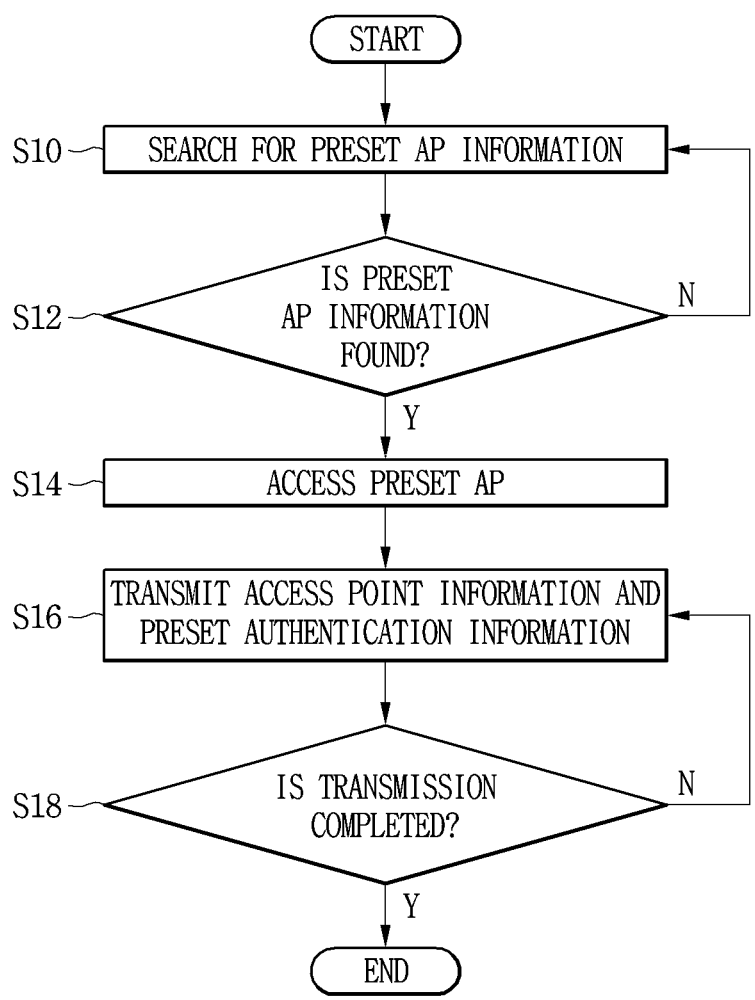
FIG. 2 is a flowchart of an operation according to an embodiment of a first electronic device of the smart home in FIG. 1.

FIG. 2 is a flowchart of an operation according to an embodiment of a first electronic device of the smart home in FIG. 1.

Referring to FIG. 2, the first electronic device may search for preset AP information in step S10. In this case, the first electronic device may be in a state in which it has accessed an access point connected to a main server. In addition, the first electronic device may search for the preset AP information regularly at a preset time interval.

When the preset AP information is found in step S12, the first electronic device may access an AP matching the preset AP information in step S14. In this example, the AP matching the preset AP information may be a second electronic device. In this case, the first electronic device may cancel an access to the access point for an access to the AP.

In addition, the first electronic device may transmit, to the second electronic device, access point information to connect to the main server and preset authentication information in step S16. Subsequently, the first electronic device may complete transmission in step S18, and may or may not search for the preset AP information again.

FIG. 3 is a flowchart of an operation according to another embodiment of a first electronic device of a smart home in FIG. 1.

Referring to FIG. 3, the first electronic device may be in a standby state after the power-ON of the first electronic device in step S20. Subsequently, when a user manipulation event occurs in step S21, e.g., when user manipulation on a user manipulation unit occurs, the first electronic device may search for preset AP information in step S22.

When the preset AP information is found in step S23, the first electronic device may access an AP matching the preset AP information in step S24. In this example, the AP matching the preset AP information may be a second electronic device. In this case, the first electronic device may cancel an access to the access point for an access to the AP.

In addition, the first electronic device may transmit, to the second electronic device, access point information to connect to a main server and preset authentication information in step S25. Subsequently, the first electronic device may complete transmission in step S26, and may or may not search for the preset AP information again.

FIG. 4 is a flowchart of an operation according to yet another embodiment of a first electronic device of a smart home in FIG. 1.

Referring to FIG. 4, the first electronic device is in a power-OFF state in step S30. In the power-OFF state, the first electronic device is powered-ON in step S31, and in the power-ON state, the first electronic device is powered-OFF in step S32 and then powered-ON in step S31.

The first electronic device may search for preset AP information in step S33 when it is powered-ON. When the preset AP information is found in step S34, the first electronic device may access an AP matching the preset AP information in step S35. In this example, the AP matching the preset AP information may be a second electronic device. In this case, the first electronic device may cancel an access to the access point for an access to the AP.

In addition, the first electronic device may transmit, to the second electronic device, access point information to connect to a main server and preset authentication information in step S36. Subsequently, the first electronic device may complete transmission in step S37, and may or may not search for the preset AP information again.

As such, the first electronic device may search for preset AP information through various operations, and transmit, to a found AP, access point information to connect to a main server and preset authentication information when an AP matching the preset AP information is found.

FIG. 5 is a flowchart of an operation according to an embodiment of a second electronic device of a smart home in FIG. 1.

Referring to FIG. 5, the second electronic device may be powered-ON in step S40. In this case, the power-ON of the second electronic device may be initial power-ON at a user's home.

After the power-ON, the second electronic device determines whether it is in a factory default state in step S41. When the second electronic device determines that it is in a factory default state, it changes a preset SSID to a soft AP mode having AP information in step S42.

Subsequently, the second electronic device has access to the first electronic device in step S43. The second electronic device receives, from the first electronic device, access point information to connect to a main server and user authentication information for authentication by the main server in step S44.

When the reception is completed in step S45, the second electronic device changes its state from the soft AP mode to a general station mode in step S46. Subsequently, after the cancellation of the access to the first electronic device, the second electronic device accesses the access point connected to the main server in step S47.

FIG. 6 is a flowchart of an operation according to another embodiment of a second electronic device of a smart home in FIG. 1.

Referring to FIG. 6, the second electronic device stands by in a general station mode after power-ON in step S51. Subsequently, when a user manipulation event occurs, the second electronic device may change from the station mode to a soft AP mode in step S53.

Subsequently, the second electronic device has access to a first electronic device in step S54. The second electronic device receives, from the first electronic device, access point information to connect to a main server and user authentication information for authentication by the main server in step S55.

When the reception is completed in step S56, the second electronic device changes from the soft AP mode back to the general station mode in step S57. Subsequently, after the cancellation of the access to the first electronic device, the second electronic device may access the access point connected to the main server in step S58.

As such, the second electronic device may change to the soft AP mode having present AP information through various operations and receive, from the first electronic device, the access point information to connect to the main server and preset authentication information in the soft AP mode.

As described above, when there is a first electronic device 100 that has completed an access to the main server 10 and user authentication and a new electronic device, i.e., a second electronic device 200, which has not completed the access to the main server 10 and user authentication, is added, the smart home according to an embodiment may enable the first electronic device to transmit information on an access to the main server 10 and authentication information for user authentication to the second electronic device.

Thus, when the second electronic device 200 is added, the smart home 1 according to an embodiment may prevent the second electronic device 200 from separately performing cumbersome procedures for an access to the main server 10 and user authentication.

Therefore, the smart home 1 according to an embodiment may simplify access and authentication processes occurring whenever an electronic device supporting a new smart home service is added. Thus, the smart home 1 according to an embodiment may provide a smart home providing remarkably improved user convenience that may more easily implement a process of accessing a main server and a user authentication process whenever electronic devices are added.

Although embodiments have been described with reference to a number of illustrative embodiments thereof, it should be understood that numerous other modifications and embodiments can be devised by those skilled in the art that may fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A smart home accessible to a main server providing a service, the smart home comprising:
a first electronic device that accesses an access point connected to the main server and having predetermined access point (AP) information and predetermined authentication information; and
a second electronic device connected to the access point and the first electronic device to perform wireless communication and having AP information matching the predetermined AP information,
wherein:
the first electronic device transmits information of the access point and the predetermined authentication information to the second electronic device when the second electronic device is found using the predetermined AP information that matches with the AP information,
the second electronic device receives information of the access point and the predetermined authentication information from the first electronic device when a predetermined AP mode is executed, wherein the predetermined AP mode comprises a soft AP mode and a station mode, and
the predetermined AP mode is executed when the second electronic device receives an initial power-ON or when a user manipulation event on the second electronic device after the initial power-ON is received.

2. The smart home according to claim 1, wherein the first electronic device searches for the AP information matching the predetermined AP information, when a predetermined search mode is executed.

3. The smart home according to claim 2, wherein the predetermined search mode is executed according to a predetermined time interval, the occurrence of a user manipulation event on the first electronic device is received, or the power-ON of the first electronic device is received.

4. The smart home according to claim 1, wherein the first electronic device cancels an access to the access point and accesses the second electronic device when the second electronic device is found.

5. The smart home according to claim 1, wherein the first electronic device cancels an access to the second electronic device and accesses the access point after the information of the access point and the preset authentication information are transmitted to the second electronic device.

6. The smart home according to claim 5, wherein the first electronic device searches for the AP information matching the predetermined AP information when the first electronic device accesses the access point.

7. The smart home according to claim 1, wherein the second electronic device completes the predetermined AP mode when the reception of the information of the access point and the predetermined authentication information is completed.

8. The smart home according to claim 7, wherein the second electronic device cancels an access to the first electronic device and accesses the access point when the preset AP mode is completed.

9. A control method of a smart home comprising:
accessing, by a first electronic device, an access point connected to a main server providing a service and having predetermined access point (AP) information and predetermined authentication information;
connecting, by a second electronic device, to the access point and the first electronic device to perform wireless communication with the access point and the first electronic device, and having AP information matching the predetermined AP information;
searching, by the first electronic device, for the second electronic device using the predetermined AP information that matches with the AP information; and
transmitting, by the first electronic device, information of the access point and the predetermined authentication information to the second electronic device when the second electronic device is found,
wherein:
the second electronic device receives the information of the access point and the predetermined authentication information from the first electronic device when a predetermined AP mode is executed, wherein the predetermined AP mode comprises a soft AP mode and a station mode, and
the predetermined AP mode is executed when the second electronic device receives an initial power-ON or when a user manipulation event on the second electronic device after the initial power-ON is received.

10. The control method according to claim 9, wherein the first electronic device searches for the AP information matching the predetermined AP information, when a predetermined search mode is executed.

11. The control method according to claim 10, wherein the predetermined search mode is executed according to a predetermined time interval, the occurrence of a user manipulation event on the first electronic device is received, or the power-ON of the first electronic device is received.

12. The control method according to claim 9, wherein the first electronic device cancels an access to the access point and accesses the second electronic device when the second electronic device is found.

13. The control method according to claim 9, wherein the first electronic device cancels an access to the second electronic device and accesses the access point, after the information of the access point and the predetermined authentication information are transmitted to the second electronic device.

14. The control method according to claim 13, wherein the first electronic device searches for the AP information matching the preset AP information when the first electronic device accesses the access point.

15. The control method according to claim 9, wherein the second electronic device completes the predetermined AP mode when the reception of the information of the access point and the predetermined authentication information is completed.

16. The control method according to claim 15, wherein the second electronic device cancels an access to the first electronic device and accesses the access point, when the predetermined AP mode is completed.

17. A smart home accessible to a main server providing a service, the smart home comprising:
a first electronic device that accesses an access point connected to the main server and having predetermined access point (AP) information and predetermined authentication information; and
a second electronic device connected to the access point and the first electronic device to perform wireless communication and having AP information matching the predetermined AP information,
wherein:
the first electronic device transmits information of the access point and the predetermined authentication information to the second electronic device when the second electronic device is found using the predetermined AP information that matches with the AP information,
the first electronic device cancels an access to the second electronic device and accesses the access point after the information of the access point and the preset authentication information are transmitted to the second electronic device, and
the first electronic device searches for the AP information matching the predetermined AP information when the first electronic device accesses the access point.

18. A control method of a smart home comprising:
accessing, by a first electronic device, an access point connected to a main server providing a service and having predetermined access point (AP) information and predetermined authentication information;
connecting, by a second electronic device, to the access point and the first electronic device to perform wireless communication with the access point and the first electronic device, and having AP information matching the predetermined AP information;
searching, by the first electronic device, for the second electronic device using the predetermined AP information that matches with the AP information; and
transmitting, by the first electronic device, information of the access point and the predetermined authentication information to the second electronic device when the second electronic device is found,
wherein:
the first electronic device cancels an access to the second electronic device and accesses the access point, after the information of the access point and the predetermined authentication information are transmitted to the second electronic device, and
the first electronic device searches for the AP information matching the preset AP information when the first electronic device accesses the access point.

* * * * *